United States Patent
Lin et al.

(10) Patent No.: US 9,843,207 B2
(45) Date of Patent: Dec. 12, 2017

(54) CHARGING APPARATUS AND CHARGING METHOD THEREOF

(71) Applicants: Tatung Company, Taipei (TW); TATUNG UNIVERSITY, Taipei (TW)

(72) Inventors: Chang-Hua Lin, Taipei (TW); Min-Hsuan Hung, Taipei (TW)

(73) Assignees: Tatung Company, Taipei (TW); TATUNG UNIVERSITY, Taipei (TW)

( * ) Notice: Subject to any disclaimer, the term of this patent is extended or adjusted under 35 U.S.C. 154(b) by 219 days.

(21) Appl. No.: 14/667,708

(22) Filed: Mar. 25, 2015

(65) Prior Publication Data

US 2016/0172887 A1 Jun. 16, 2016

(30) Foreign Application Priority Data

Dec. 10, 2014 (TW) .............................. 103143027 A

(51) Int. Cl.
*H02J 7/06* (2006.01)
*H02J 7/00* (2006.01)

(52) U.S. Cl.
CPC ............ *H02J 7/0052* (2013.01); *H02J 7/007* (2013.01); *H02J 7/0073* (2013.01); *H02J 2007/005* (2013.01)

(58) Field of Classification Search
CPC ........ H02J 7/007; H02J 7/0073; H02J 7/0052; H02J 2007/005
USPC ........................................ 320/107, 157, 164
See application file for complete search history.

(56) References Cited

U.S. PATENT DOCUMENTS

2007/0188134 A1\* 8/2007 Hussain ................ H01M 10/44
320/114
2013/0342173 A1\* 12/2013 Das ......................... H02J 7/045
320/162

FOREIGN PATENT DOCUMENTS

| TW | 220442 | 2/1994 |
| TW | 200928404 | 7/2009 |
| TW | 201145759 | 12/2011 |
| TW | 201330356 | 7/2013 |
| TW | 201332250 | 8/2013 |
| TW | 201346303 | 11/2013 |
| TW | 201405915 | 2/2014 |
| TW | I444639 | 7/2014 |
| TW | M481537 | 7/2014 |

OTHER PUBLICATIONS

"Office Action of Taiwan Counterpart Application", dated Dec. 2, 2015, p. 1-p. 7.

\* cited by examiner

*Primary Examiner* — Edward Tso
*Assistant Examiner* — Aaron Piggush
(74) *Attorney, Agent, or Firm* — JCIPRNET

(57) ABSTRACT

A charging apparatus that can perform a charging action based on an initial capacity of a battery and a charging method of the charging apparatus are provided. The charging apparatus estimates the initial capacity of the battery, calculates an amount of a charging current according to the initial capacity of the battery, and provides the calculated amount of the charging current corresponding to the initial capacity of the battery.

9 Claims, 4 Drawing Sheets

CHARGING APPARATUS AND CHARGING METHOD THEREOF

CROSS-REFERENCE TO RELATED APPLICATION

This application claims the priority benefit of Taiwan application serial no. 103143027, filed on Dec. 10, 2014. The entirety of the above-mentioned patent application is hereby incorporated by reference herein and made a part of this specification.

FIELD OF THE INVENTION

The invention relates to an electronic apparatus; more particularly, the invention relates to a charging apparatus and a charging method thereof.

DESCRIPTION OF RELATED ART

At present, chargers on the market perform a charging action by providing a constant current and a constant voltage in a two-stage charging manner. In principle, the charging action is performed by providing a constant current to reduce the charging time frame; once the battery is charged and reaches the maximum charging voltage, the charging action is performed by providing a constant voltage. Until the charging current is reduced to zero, the battery is deemed fully charged, and the charging process is then completed. Said process has certain drawbacks. For instance, the required time frame during which the charging current is reduced to zero cannot be estimated if the charging action is performed by providing the constant voltage, i.e., the charging completion time frame of the battery cannot be learned in advance. In addition, it is not accurate to determine whether the battery is fully charged by the voltage. Moreover, the predetermined amount of the charging current may pose an impact on the charging time frame and the actual amount of the charging current provided to the battery. If the predetermined amount of the charging current is large, the charging time frame may be reduced, whereas the battery may not be fully charged, and the battery may be damaged and may thus have the reduced life span; if the predetermined amount of the charging current is small, the battery may be fully charged, while the charging time frame may be extended The existing chargers on the market cannot perform the charging action in response to the capacity of the battery or users' demands, accordingly causing inconvenience to the users.

SUMMARY OF THE INVENTION

The invention is directed to a charging apparatus and a charging method thereof. Specifically, a charging method may be provided in response to a capacity of a battery and users' demands, so as to extend the life span of the battery and facilitate the use of the charging apparatus.

In an embodiment of the invention, a charging apparatus that includes a detection unit, a charging unit, and a control unit is provided. The detection unit detects a voltage and a current of a battery. The charging unit is coupled to the battery, and the control unit is coupled to the detection unit and the charging unit. Here, the control unit calculates a state of charge of the battery according to a detection result of the detection unit, calculates an amount of a charging current according to an initial capacity of the battery and a selected charging mode, and controls the charging unit to correspondingly provide the calculated amount of the charging current to the battery.

According to an embodiment of the invention, the charging apparatus further has a plurality of charging modes, and the control unit further receives a mode selection command, calculates the amount of the charging current according to the initial capacity of the battery and one of the charging modes corresponding to the mode selection command, and controls the charging unit to provide the amount of the charging current corresponding to the one of the charging mode to the battery.

According to an embodiment of the invention, each of the charging modes corresponds to different charging completion time frames, and the control unit further calculates and adjusts the amount of the charging current of the charging unit according to the initial capacity of the battery and one of the charging completion time frames corresponding to one of the charging modes, so as to completely charge the battery within the one of the charging completion time frames.

According to an embodiment of the invention, at least one of the charging modes includes a plurality of charging stages, each of the charging stages corresponds to different amounts of the charging current, and the control unit further switches to the charging stages according to the state of charge of the battery, so as to adjust the amounts of the charging current of the battery.

According to an embodiment of the invention, the charging current corresponding to at least one of the charging modes is a constant current.

In an embodiment of the invention, a charging method of a charging apparatus includes following steps. A voltage and a current of a battery are detected. A state of charge of the battery is calculated according to a detection result of the voltage and the current. An amount of a charging current provided to the battery is calculated and controlled according to an initial capacity of the battery and a selected charging mode.

According to an embodiment of the invention, the charging method further includes following steps. A mode selection command is received. One of a plurality of charging modes of the battery is selected according to the mode selection command, and each of the charging modes of the battery has one corresponding way to calculate the amount of the charging current.

According to an embodiment of the invention, the selected charging mode has a corresponding charging completion time frame, and the step of calculating and controlling the amount of the charging current provided to the battery according to the initial capacity of the battery and the selected charging mode includes calculating and adjusting the amount of the charging current according to the initial capacity of the battery and the charging completion time frame corresponding to the selected charging mode, so as to completely charge the battery within the charging completion time frame.

According to an embodiment of the invention, the selected charging mode includes a plurality of charging stages, each of the charging stages corresponds to different amounts of the charging current, and the step of calculating and controlling the amounts of the charging current provided to the battery according to the state of charge of the battery comprises switching to the charging stages according to the state of charge of the battery, so as to adjust the amount of the charging current of the battery.

According to an embodiment of the invention, the charging current corresponding to the selected charging mode is a constant current.

In view of the above, according to an embodiment of the invention, the amount of the charging current provided by the charging unit to the battery can be calculated according to the initial capacity of the battery and can be controlled, and the battery can be charged according to the charging mode selected by a user, so as to extend the life span of the battery and further facilitate the use of the charging apparatus.

Several exemplary embodiments accompanied with figures are described in detail below to further describe the invention in details.

DETAILED DESCRIPTION OF DISCLOSED EMBODIMENTS

Figure 1:
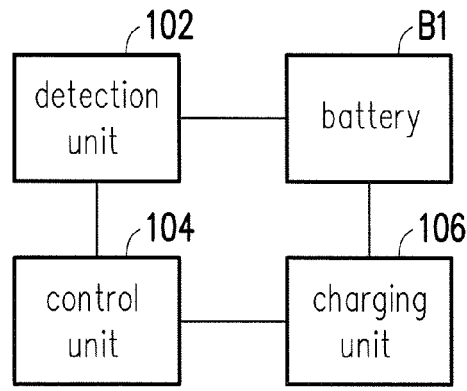
FIG. 1 is a schematic view illustrating a charging apparatus according to an embodiment of the invention.

FIG. 1 is a schematic view illustrating a charging apparatus according to an embodiment of the invention. As shown in FIG. 1, the charging apparatus includes a detection unit 102, a control unit 104, and a charging unit 106, and the detection unit 102 and the charging unit 106 are coupled to the control unit 104 and a battery B1. The detection unit 102 may measure a voltage and a current of the battery B1, and the control unit 104 may calculate a capacity of the battery B1 at present according to a detection result of the detection unit 102.

Figure 2:
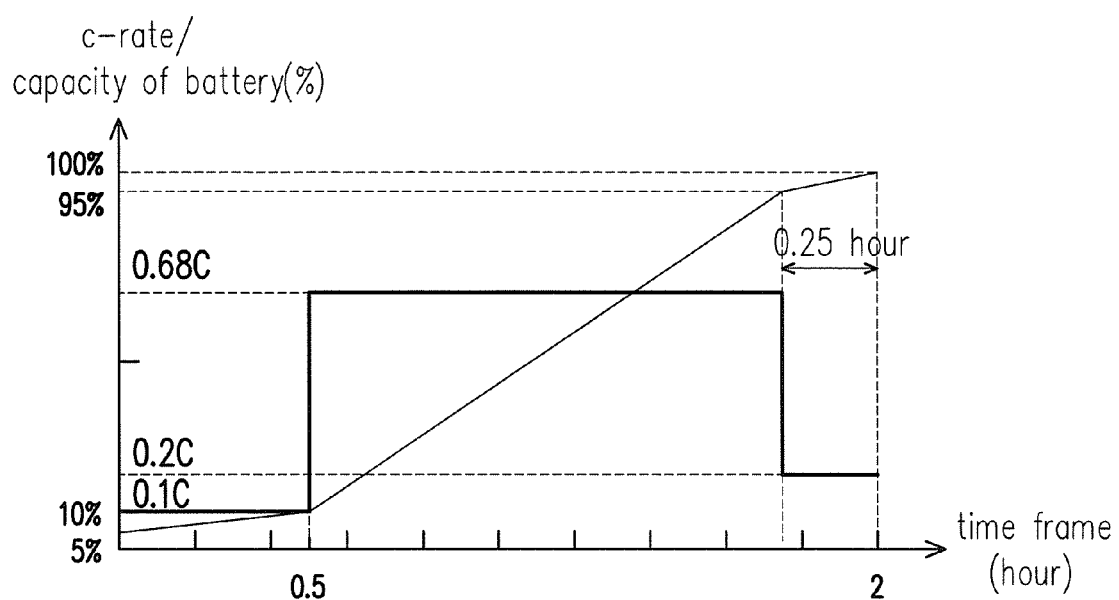
FIG. 2 and FIG. 3 schematically illustrate a correlation between a charging time frame and a capacity of a battery as well as a charging rate (a c-rate) in a normal charging mode respectively according to an embodiment of the invention.

After the capacity of the battery B1 is calculated, the control unit 104 may further calculate an amount of a charging current according to an initial capacity of the battery B1 and a selected charging mode and control the charging unit 106 to correspondingly provide the calculated amount of the charging current to the battery B1. For instance, FIG. 2 schematically illustrates a correlation between a charging time frame and a capacity of a battery as well as a charging rate (a c-rate) in a normal charging mode according to an embodiment of the invention; in FIG. 2, the amount of the charging current is depicted by a bold solid line, and the capacity of the battery B1 at present is illustrated by a fine solid line. In the present embodiment, the charging apparatus is in the normal charging mode where the control unit 104 is able to control the charging unit 106 to charge the battery B1 with different amounts of the charging unit in different charging stages. As shown in FIG. 2, if the capacity of the battery B1 is 10% or below, the charging apparatus is in the first charging stage, and the control unit 104 controls the charging unit 106 to charge the battery B1 with a charging current of 0.1 C; if the capacity of the battery B1 is between 10%-95%, the control unit 104 controls the charging unit 106 to charge the battery B1 with a charging current of 0.68 C; if the capacity of the battery B1 is from 95% to 100%, the control unit 104 controls the charging unit 106 to charge the battery B1 with a charging current of 0.2 C. When the capacity of the battery B1 is between 10%-95%, the amount of the charging current can be calculated by the following equation:

$$I = \frac{0.95 - 0.10}{2 - 0.25 - t} \times 1C = \frac{0.85C}{1.75 - t} \tag{10}$$

Here, I is the charging current, t is the time spent by the charging unit 106 in the first charging stage, and C is a charging rate and stands for the unit for calculating the amount of the charging current while the battery is charged or discharged. For instance, in case of the battery with the capacity of 1 Ah, the current of 0.2 C represents that the battery is charged or discharged by a 0.2 A current. In the present embodiment, the time spent by the charging unit 106 in the first charging stage is 0.5 hour, and the charging rate is 0.68 C in the second charging stage.

According to the state of charge of the battery B1, the charging unit 106 is switched to different charging stages corresponding to different amounts of the charging current; thereby, even in case of the small capacity of the battery B1, the life span of the battery B1 is not reduced because of receipt of an excessive amount of the charging current. In addition, when the battery B1 is almost fully charged, the battery B1 is charged by a relatively small amount of charging current, so as to ensure that the battery B1 can be fully charged.

Figure 3:
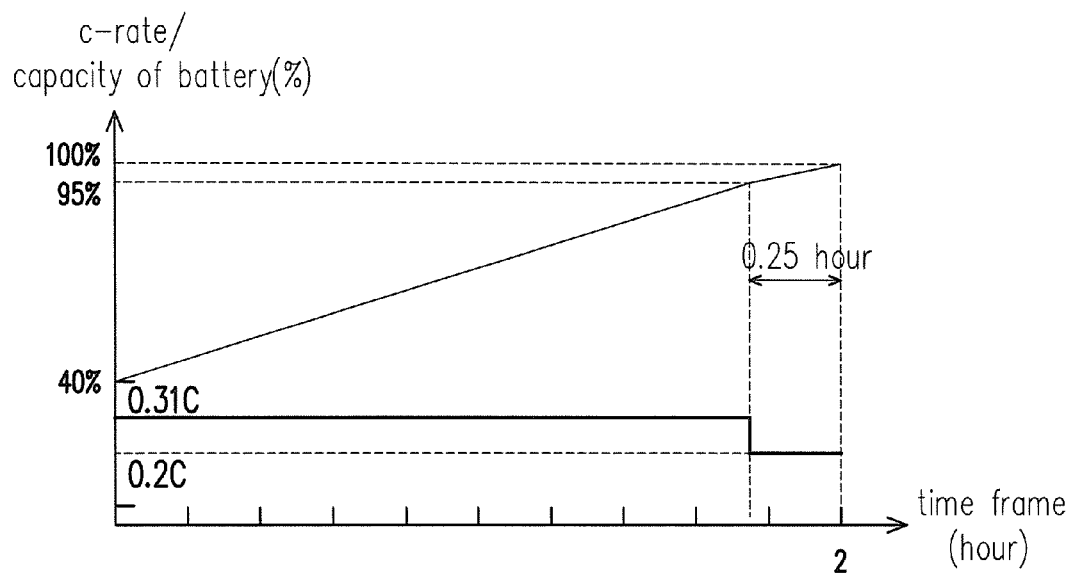

Note that the charging current in each charging stage is not limited to the embodiment shown in FIG. 2, and the control unit 104 is able to adjust the charging current in each charging stage according to the predetermined charging completion time frame in the normal charging mode and the capacity of the battery B1 at present. For instance, FIG. 3 schematically illustrates a correlation between a charging time frame and a capacity of a battery as well as a c-rate in a normal charging mode according to another embodiment of the invention. As shown in FIG. 3, the initial capacity of the battery B1 is 40%, which is already greater than the corresponding capacity (10% or below) of the battery B1 in the first charging stage, and thus the charging action may be directly initiated in the second charging stage. The charging completion time frame in the normal charging mode is 2 hours (which should not be construed as a limitation to the invention), and the required time frame in the third charging stage is 0.25 hour. Therefore, in the second charging stage, the control unit 104 may control the charging unit 106 to charge the battery B1 with a charging current of 0.361 C (which is less than that provided in the embodiment shown in FIG. 2).

Besides, in other embodiments of the invention, the charging apparatus may be in plural charging modes (including the aforesaid normal charging mode, a fast charging mode, and a safe charging mode, for instance) which can be selected by users. The control unit 104 may control the charging unit 106 based on a mode selection command received by the control unit 104 to charge the battery B1 in the selected charging mode. The correlations between the charging time frame and the capacity of the battery as well as the c-rate in the fast charging mode and in the safe charging mode are respectively shown in FIG. 4 and FIG. 5.

Figure 4:
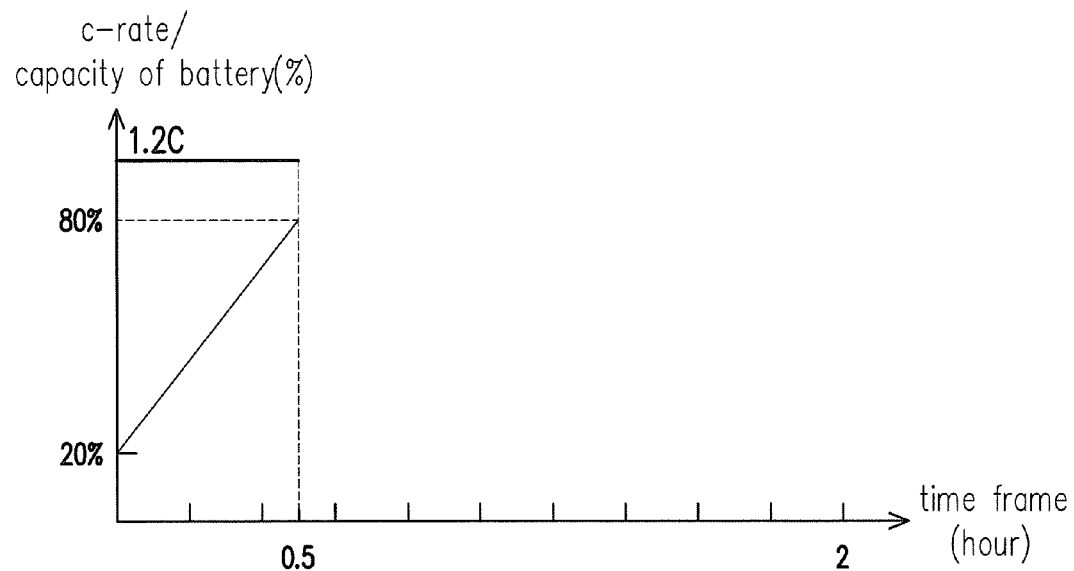
FIG. 4 schematically illustrates a correlation between a charging time frame and a capacity of a battery as well as a charging rate (a c-rate) in a fast charging mode according to an embodiment of the invention.

As shown in FIG. 4, the initial capacity of the battery B1 is 20% (and is not limited thereto), and the charging completion time frame in the fast charging mode is 30 minutes (and is not limited thereto). After the battery B1 is charged in the fast charging mode, the capacity of the battery B1 reaches 80% (and is not limited thereto). The control unit 104 may control the charging unit 106 to provide the charging current to the battery B1 according to the charging completion time frame and the capacity of the battery B1 at present (e.g., in the present embodiment, the charging unit 106 charges the battery B1 with the charging current of 1.2 C, which should not be construed as a limitation to the invention), such that the capacity of the battery B1 may reach 80% within 30 minutes. The amount of the charging current may be calculated by the following equation.

$$I = \frac{0.8 - SOC}{0.5} \times 1C \quad (11)$$

Here, SOC stands for the initial capacity of the battery B1, i.e., the capacity of the uncharged battery B1. In the embodiment shown in FIG. 4, SOC is equal to 0.2 (i.e., SOC=20%), and thus the charging current is 1.2 C.

Figure 5:
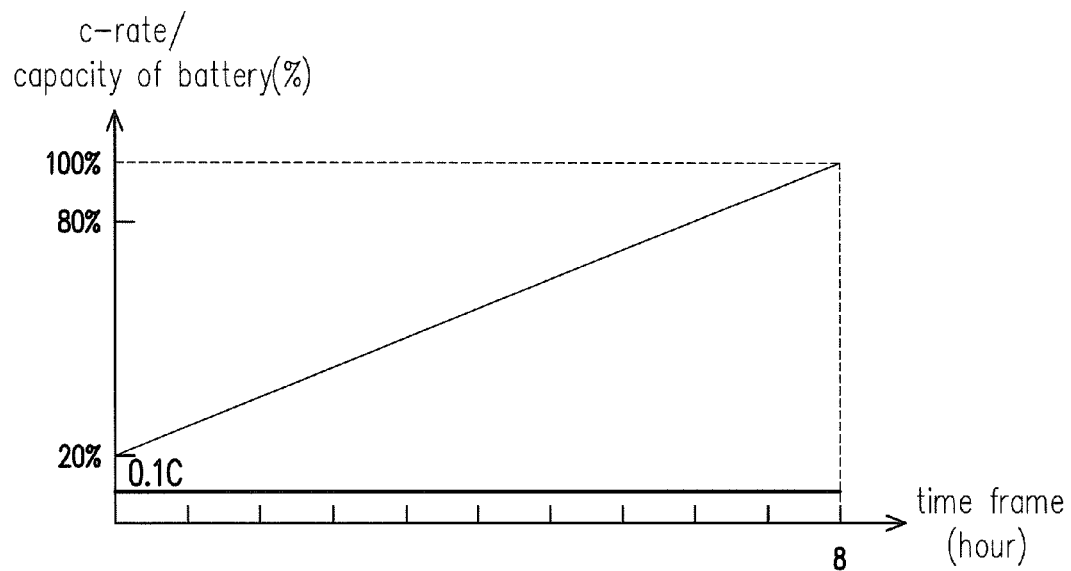
FIG. 5 schematically illustrates a correlation between a charging time frame and a capacity of a battery as well as a charging rate (a c-rate) in a safe charging mode according to an embodiment of the invention.

As shown in FIG. 5, the initial capacity of the battery B1 is 20% (and is not limited thereto), and the charging completion time frame in the safe charging mode is 8 hours (and is not limited thereto). After the battery B1 is charged in the safe charging mode, the capacity of the battery B1 reaches 100%. The control unit 104 may control the charging unit 106 to provide the charging current to the battery B1 according to the charging completion time frame and the capacity of the battery B1 at present (e.g., in the present embodiment, the charging unit 106 charges the battery B1 with the charging current of 0.1 C, which should not be construed as a limitation to the invention), such that the capacity of the battery B1 may reach 100% within 8 hours. In the safe charging mode, the amount of the charging current provided by the charging unit 106 is rather small, and the issue of reducing the life span of the battery B1 due to the excessive amount of the charging current does not arise; hence, the battery B1 may be directly charged in the safe charging mode until the capacity of the battery B1 reaches 100%. The amount of the charging current may be calculated by the following equation.

$$I = \frac{1 - SOC}{8} \times 1C \quad (12)$$

Here, SOC stands for the initial capacity of the battery B1, i.e., the capacity of the uncharged battery B1. In the embodiment shown in FIG. 5, SOC is equal to 0.2 (i.e., SOC-20%), and thus the charging current is 0.1 C.

Figure 6:
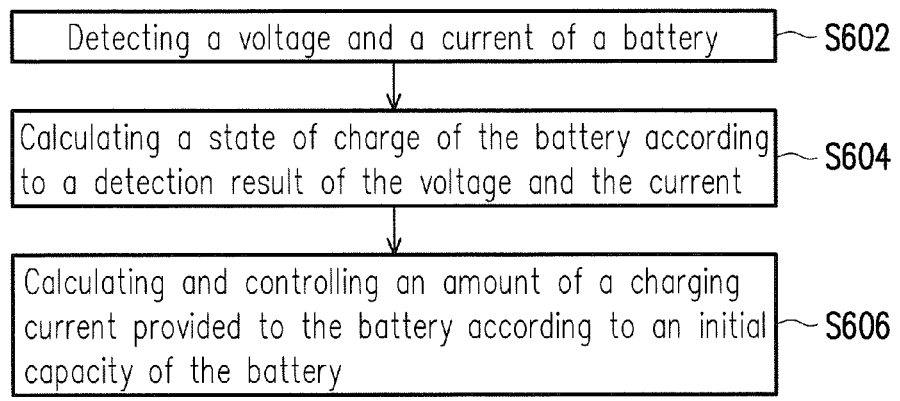
FIG. 6 is a schematic flowchart of a charging method of a charging apparatus according to an embodiment of the invention.
Figure 7:
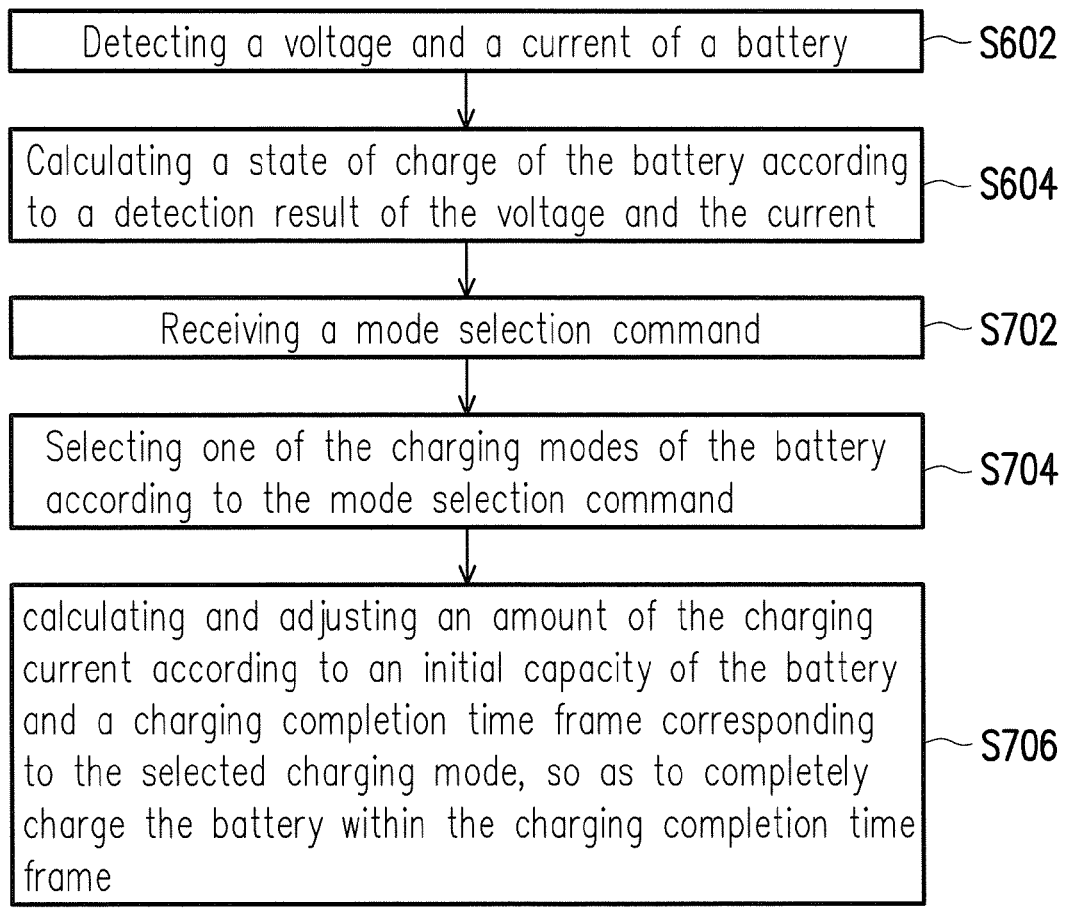
FIG. 7 is a schematic flowchart of a charging method of a charging apparatus according to another embodiment of the invention.

FIG. 6 is a schematic flowchart of a charging method of a charging apparatus according to an embodiment of the invention. As shown in FIG. 6, the charging method of the charging apparatus (provided in the previous embodiments) may include following steps. A voltage and a current of a battery are detected (step S602). A state of charge of the battery is calculated according to a detection result of the voltage and the current (step S604). An amount of a charging current provided to the battery is calculated and controlled according to an initial capacity of the battery (step S606). In other embodiments of the invention, the charging apparatus may be in plural charging modes, and the charging method of the charging apparatus in plural charging modes may be shown in FIG. 7. The difference between the embodiment shown in FIG. 7 and the embodiment shown in FIG. 6 lies in that a mode selection command is further received in step S702; in step S704, one of the charging modes of the battery is selected according to the mode selection command. Different charging modes correspond to different ways to calculate the amount of the charging current. The charging modes may include the normal charging mode, the fast charging mode, and the safe charging mode, and each of the charging modes has a corresponding charging completion time frame. In the present embodiment, the step of calculating and controlling the amount of the charging current provided to the battery according to the initial capacity of the battery and the selected charging mode may include calculating and adjusting the amount of the charging current according to the initial capacity of the battery and the charging completion time frame corresponding to the selected charging mode, so as to completely charge the battery within the charging completion time frame (step S706). In some embodiments of the invention, each charging mode (e.g., said normal charging mode) may include a plurality of charging stages, each of the charging stages corresponds to different amounts of the charging current, and the control unit further switches to the charging stages according to the state of charge of the battery, so as to adjust the amounts of the charging current of the battery. Thereby, the life span of the battery is not reduced, and the battery can be fully charged without doubt.

In an embodiment of the invention, after the detection unit is applied to detect the voltage and the current of the battery B1, the state of charge of the battery may be calculated by several conventional methods, such as an open-circuit voltage method, a Coulomb counting method, a neural algorithm, a fuzzy algorithm, a Kalman algorithm, and a genetic algorithm, etc., which should not be construed as limitations to the invention.

To sum up, according to an embodiment of the invention, the amount of the charging current provided by the charging unit to the battery can be calculated according to the initial capacity of the battery and the selected charging mode and can be controlled, and the battery can be charged according to the charging mode selected by a user, so as to extend the life span of the battery and further facilitate the use of the charging apparatus. In addition, in the embodiments of the invention, the charging current is applied to charge the battery, and thus both the charging completion time frame of the battery and the state of charge of the battery can be accurately estimated.

What is claimed is:

1. A charging apparatus comprising:
   a detection unit detecting a voltage and a current of a battery;
   a charging unit coupled to the battery; and
   a control unit coupled to the detection unit and the charging unit, the control unit calculating a state of charge of the battery according to a detection result of the detection unit, calculating an amount of a charging current according to an initial capacity of the battery and a selected charging mode selected from a plurality of charging modes of the battery by a user, and controlling the charging unit to provide the calculated amount of the charging current to the battery, wherein each of the charging modes comprises a plurality of charging stages, and each of the charging stages corresponds to different amounts of the charging current.

2. The charging apparatus according to claim 1, wherein the control unit further receives a mode selection command, calculates the amount of the charging current according to the initial capacity of the battery and one of the charging modes corresponding to the mode selection command, and controls the charging unit to provide the amount of the charging current corresponding to the one of the charging mode to the battery.

3. The charging apparatus according to claim 2, wherein each of the charging modes corresponds to different charging completion time frames, and the control unit further calculates and adjusts the amount of the charging current of the charging unit according to the initial capacity of the battery and one of the charging completion time frames corresponding to one of the charging modes, so as to completely charge the battery within the one of the charging completion time frames.

4. The charging apparatus according to claim 2, wherein the control unit further switches to the charging stages according to the state of charge of the battery, so as to adjust the amounts of the charging current of the battery.

5. A charging method of a charging apparatus, comprising:
   detecting a voltage and a current of a battery;
   calculating a state of charge of the battery according to a detection result of the voltage and the current; and
   calculating and controlling an amount of a charging current provided to the battery according to an initial capacity of the battery and a selected charging mode selected from a plurality of charging modes of the battery by a user, wherein each of the charging modes comprises a plurality of charging stages, and each of the charging stages corresponds to different amounts of the charging current.

6. The charging method according to claim 5, further comprising:
   receiving a mode selection command; and
   selecting one of the plurality of charging modes of the battery according to the mode selection command, each of the charging modes of the battery having one corresponding way to calculate the amount of the charging current.

7. The charging method according to claim 6, wherein the selected charging mode has a corresponding charging completion time frame, and the step of calculating and controlling the amount of the charging current provided to the battery according to the initial capacity of the battery and the selected charging mode comprises:
   calculating and adjusting the amount of the charging current according to the initial capacity of the battery and the charging completion time frame corresponding to the selected charging mode, so as to completely charge the battery within the charging completion time frame.

8. The charging method according to claim 6, wherein the step of calculating and controlling the amounts of the charging current provided to the battery according to the state of charge of the battery comprises:
   switching to the charging stages according to the state of charge of the battery, so as to adjust the amount of the charging current of the battery.

9. The charging method according to claim 5, wherein a method of estimating the state of charge of the battery comprises an open-circuit voltage method, a Coulomb counting method, a neural algorithm, a fuzzy algorithm, a Kalman algorithm, and a genetic algorithm.

* * * * *